United States Patent [19]

Rees

[11] Patent Number: 4,897,583
[45] Date of Patent: Jan. 30, 1990

[54] VARIABLE SPEED VARIABLE TORQUE BRUSHLESS DC MOTOR

[75] Inventor: Fenton L. Rees, Rockford, Ill.

[73] Assignee: Sundstrand Corporation, Rockford, Ill.

[21] Appl. No.: 319,719

[22] Filed: Mar. 7, 1989

[51] Int. Cl.$^4$ ............................................. H02P 6/02
[52] U.S. Cl. ..................................... 318/254; 318/138
[58] Field of Search ......................... 318/138, 254, 439

[56] References Cited

U.S. PATENT DOCUMENTS

| | | | |
|---|---|---|---|
| 4,097,788 | 6/1978 | Nygaard et al. ................. | 318/138 X |
| 4,127,799 | 11/1978 | Nakamura et al. .............. | 318/254 A |
| 4,258,299 | 3/1981 | Takeda et al. ..................... | 318/254 |
| 4,720,663 | 1/1988 | Welch et al. ......................... | 318/254 |

OTHER PUBLICATIONS

Publication, "Solid State Control of Ultra High Speed Compressor Motor", Rees et al.

*Primary Examiner*—Bentsu Ro
*Attorney, Agent, or Firm*—Antonelli, Terry & Wands

[57] ABSTRACT

A variable speed variable torque brushless DC motor (32) having at least one position sensor (34) with each position sensor producing a position signal indicating position of the rotor and having a frequency equal to a frequency of excitation current applied for activating stator windings in accordance with the invention includes a pulse generator (36) for producing first pulses having a frequency which is equal to nf where n is the number of position sensors and f is the frequency of excitation current; a source (39) of a first signal having a frequency f1 wherein f1 ≧ f; a source (41) of a variable frequency second signal having a frequency f2 with f2 ≧ f1; an excitation circuit (48) for applying excitation current pulses to the stator windings with the excitation current pulses occurring in response to position signals produced by the at least one position sensor; a delay circuit (38, 40, 42, 44 and 46) responsive to the first pulses, the first signal and the second signal for delaying the application of the position signals to the excitation circuit the delay being equal to mf1/nf2 with m being an integer.

12 Claims, 8 Drawing Sheets

VARIABLE SPEED VARIABLE TORQUE BRUSHLESS DC MOTOR

Cross Reference to Related Applications

Reference is made to the following related applications which are filed on even date herewith which are incorporated herein by reference in their entirety.

(1) "Feedback Circuit For Eliminating DC Offset in Drive Current of an AC Motor", U.S. patent application Ser. No. 320,224, filed on even date herewith (Attorney Ref. No. 002.26496X00); and (2) "Digital Synchronizing Circuit For Brushless DC Motor", U.S. patent application Ser. No. 319,727, filed on even date herewith (Attorney Ref. No. 002.25975X00).

TECHNICAL FIELD

The present invention relates to digital control of variable speed brushless DC motors.

BACKGROUND ART

Brushless DC motors are controlled by sensing the position of the rotor and then switching the power to the stator windings through an inverter in a manner which is a function of the position of the rotor. Circuits are well known for sensing the position of the rotor such as Hall effect position sensors which produce pulse trains having a duty cycle of 50%. These position signals are used to control the precise switching point at which power is applied to the stator windings. The torque produced by the rotor may be changed by varying the angle at which the windings of the stator are activated with respect to the position of the rotor.

Figure 1:
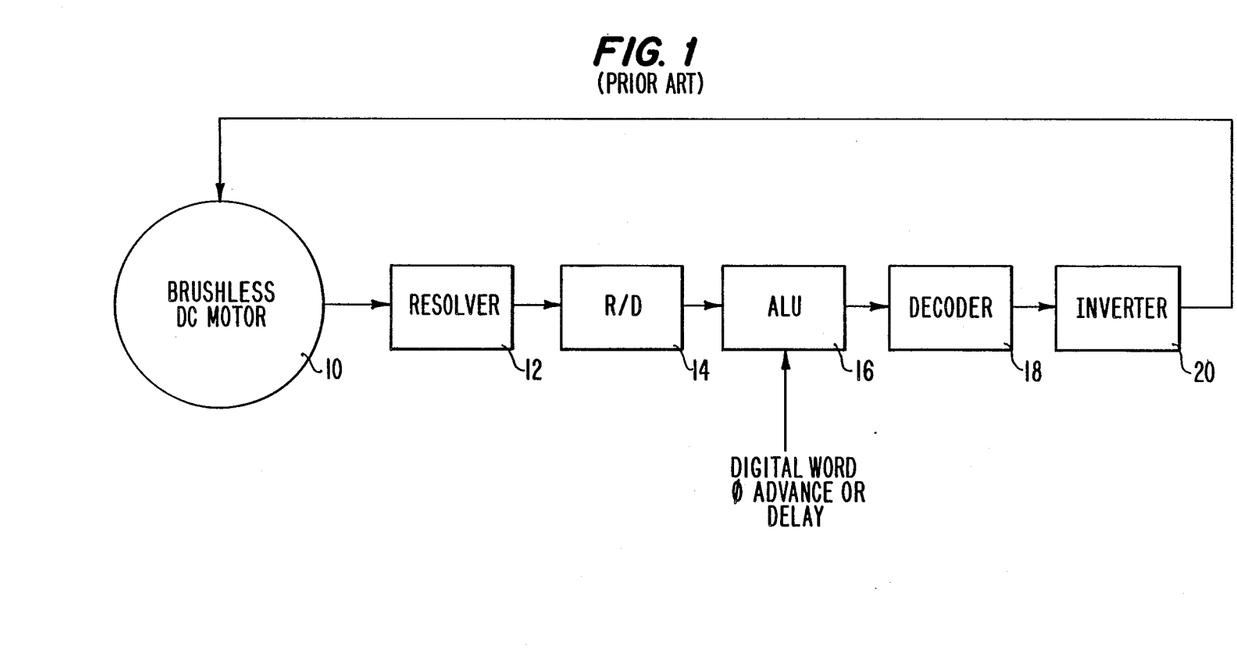
FIG. 1 illustrates a prior art brushless DC motor.

FIG. 1 illustrates a prior art torque control for a variable speed brushless DC motor. The rotor (not illustrated) of brushless DC motor 10 is mechanically coupled to a resolver 12 which produces a pair of analog output signals which are in phase quadrature to each other. The phase quadrature signals are applied to a resolver to digital converter 14 which functions to convert the analog phase quadrature signals into a digital counterpart. The output digital phase quadrature signals are applied to an arithmetic logic unit (ALU) 16 which functions to add or subtract a digital word proportional to the desired phase advance or delay of the rotor position signals produced by the resolver 12 to control the torque produced by the motor. The resultant digitally encoded phase quadrature signals produced by the ALU 16 which reflect a desired amount of phase advance or delay, are applied to a decoder 18 which decodes the signals to produce suitable switching signals applied to inverter 20 having an output applied to stator windings (not illustrated) of the brushless DC motor. While the foregoing system functions to accurately control the torque of a brushless DC motor, it suffers from the disadvantage that the circuitry in the resolver to digital converter 14, which functions to convert the analog resolver signals into a digital counterpart is too slow to permit torque control for DC motors having high speed applications. Thus in situations where rotor velocities of 30,000 or more revolutions per minute are required, the processing speed of the electronics in the resolver to digital converter 14 is insufficient to produce precise torque control of the brushless DC motor 10 by varying the angular position of the control signals applied to the inverter 20 from the angular position at which the control signals would be applied to the inverter without phase compensation.

U.S. Pat. Nos. 4,546,293, 4,584,505, 4,572,999, 4,692,674, 4,680,515 and 4,697,125 disclose examples of controls for brushless DC motors. U.S. Pat. Nos. 4,072,884 and 4,447,771 each disclose examples of brushless DC motor controls utilizing analog signal processing which, as described above, may present difficulty in control where high speed applications are required. U.S. Pat. No. 4,584,505 discloses a variable torque brushless DC motor control in which rotor position signals are applied to a pulse delay circuit 7 which produces delayed control pulses which are used to control the switching of the stator windings of the brushless DC motor. The degree of delay produces a controllable reaction torque such that the greater the delay the smaller the net torque applied to the rotor. None of the foregoing patents discloses a variable torque control for a variable velocity brushless DC motor based upon the ratio of a fixed frequency signal and a variable frequency signal whose frequency is proportional to the desired degree of phase delay of control signals applied to an excitation circuit of the stator windings of a brushless DC motor which ratio is independent of rotor velocity.

DISCLOSURE OF INVENTION

The present invention provides a variable velocity variable torque brushless DC motor in which phase advance of signals applied to stator windings with respect to rotor position is independent of rotor velocity. With the invention, the ratio of a first fixed frequency signal which is counted by an up counter during an interval that is proportional to the rotational velocity of the rotor and a second variable frequency signal which is counted by a second counter loaded with the count counted by the first counter determines the phase delay of the position signals applied to the excitation circuit of the stator windings of the brushless DC motor. The higher the frequency of the second signal with respect to the first signal, the smaller the phase delay of the position signals applied to the excitation circuit of the stator windings of the brushless DC motor. A cyclical pulse train, which is a function of a corresponding position signal, is EXCLUSIVE ORed with the position signal to produce the delayed position signal. The pulse train corresponding to each position signal has pulses beginning at each positive and negative going transition in the position signal with a duration equal to $mf1/mf2$ wherein $f1$ and $f2$ are the foregoing signal frequencies and m is an integer and n is the number of phases present in the motor. The foregoing control produces delayed position signals independent of motor speed which permits control of the torque of the motor.

A variable speed variable torque brushless DC motor having at least one rotor position sensor with each position sensor producing a position signal indicating position of the rotor and having a frequency equal to a frequency of excitation current applied for activating stator windings of the motor in accordance with the invention includes a pulse generator, responsive to the at least one position sensors, for producing first pulses having a frequency which is equal to $nf$ where n is the number of position sensors and f is the frequency of excitation current; a source of a first signal having a frequency $f1$ wherein $f1 > f$; a source of a variable frequency second signal having a frequency $f2$ with $f2 \geq f1$; an excitation circuit for applying excitation current pulses to the stator windings with the excitation current pulses occurring in response to position signals produced by the at least one position sensor; a delay circuit, responsive to the first pulses, the first signal, and the second signal for delaying the application of the position signals to the excitation circuit with the delay being equal to mf1/mf2 and m is an integer. The delay circuit includes a first counter, responsive to the first pulses and to the first signal, for counting a number of cycles of the first signal which occur between successive first pulses; a second counter, responsive to the first pulses, the second signal and a count of the first counter occurring before resetting of the first counter for counting down from the count of the first counter to zero for producing a reset pulse in response to each time the second counter counts to zero; a flip-flop, having a set terminal coupled to the first pulses and a reset terminal coupled to the reset pulses for producing a delay signal having a duration equal to a time interval between a successive occurrence of a first pulse being applied to the set terminal and a reset pulse being applied to the reset terminal; and means, responsive to the delay signal and the position signals, for producing delayed position signals which are applied to the excitation circuit, each delayed position signal corresponding to a single position signal produced by one of the position sensors. The means for producing delayed position signals includes a first array of EXCLUSIVE OR gates, equal in number to the number of position sensors, each EXCLUSIVE OR gate having a pair of inputs, with the inputs of each EXCLUSIVE OR gate being from different position sensors with none of the EXCLUSIVE OR gates having an identical combination of inputs, each EXCLUSIVE OR gate having an output; an array of AND gates equal in number to the number of EXCLUSIVE OR gates, with an AND gate corresponding to each EXCLUSIVE OR gate, with each AND gate having an input coupled to an output of a corresponding EXCLUSIVE OR gate, and a second input coupled to the delay signal; a second array of EXCLUSIVE OR gates equal in number to the number of position sensors with an EXCLUSIVE OR gate in the second array corresponding to an AND gate in the array of AND gates and a position sensor, each EXCLUSIVE OR gate of the second array having a pair of inputs with one of the inputs of each of the EXCLUSIVE OR gates of the second array being coupled to an output of a corresponding AND gate and a second input coupled to a corresponding position sensor; outputs of the EXCLUSIVE OR gates of the second array being the delayed position signal.

A variable speed variable torque brushless DC motor having at least one rotor position sensor with each position sensor producing a position signal indicating position of the rotor and having a frequency equal to a frequency of excitation current applied for activating stator windings of the motor in accordance with the invention includes a pulse generator, responsive to the at least one position sensor, for producing first pulses having a frequency which is equal to nf where n is the number of position sensors and f is the frequency of excitation current; a source of a first signal having a frequency f1 wherein f1 > f; a source of a variable frequency second signal having a frequency f2 wherein f2 ≧ f1; an excitation circuit for applying excitation current pulses to the stator windings with the excitation current pulses occurring in response to position signals produced by the at least one position sensor; and a plurality of delay circuits with the number of delay circuits being an integer m ≧ 2, each delay circuit being responsive to the first pulses, the first signal and the second signal for delaying the application of the position signals to the excitation circuit with the delay being equal to mf1/mf2. Each delay circuit comprises a first counter, responsive to the first pulses and to the first signal, for counting a number of cycles of the first signal which occur between successive first pulses; a second counter, responsive to the first pulses, the second signal, and a count of the first counter occurring before resetting of the first counter for counting down from the count of the first counter to zero for producing a reset pulse in response to each time the second counter counts to zero; a flip-flop, having a set terminal coupled to the first pulses and a reset terminal coupled to the reset pulses, for producing a delay signal having a duration equal to a time interval between a successive occurrence of a first pulse being applied to the set terminal and a reset pulse being applied to the reset terminal; and a delay position signal generator, responsive to the delay signal from the flip-flop and the position signals from the position sensors for producing delayed position signals which are applied to the excitation circuit, each delayed position signal corresponding to a single position signal produced by one of the position sensors. Each of the circuits for producing delayed position signals comprises a first array of EXCLUSIVE OR gates, equal in number to the number of position sensors divided by m, each EXCLUSIVE OR gate having a pair of inputs with the inputs of each EXCLUSIVE OR gate being from a different position sensor with none of the EXCLUSIVE OR gates having a identical combination of inputs, each EXCLUSIVE OR gate having an output; an array of AND gates equal in number to the number of EXCLUSIVE OR gates with an AND gate corresponding to each EXCLUSIVE OR gate with each AND gate having an input coupled to an output of a corresponding EXCLUSIVE OR gate and a second input coupled to the delay signal; and a second array of EXCLUSIVE OR gates equal in number to the number of position sensors divided by m with an EXCLUSIVE OR gate in the second array corresponding to an AND gate in the array of AND gates and a position sensor, each EXCLUSIVE OR gate of the second array having a pair of inputs with one of the inputs of each of the EXCLUSIVE OR gates of the second array being coupled to the output of a corresponding AND gate and a second input coupled to a corresponding position sensor, outputs of the EXCLUSIVE OR gates of the second array being the delayed position signals.

BEST MODE FOR CARRYING OUT THE INVENTION

Figure 2:
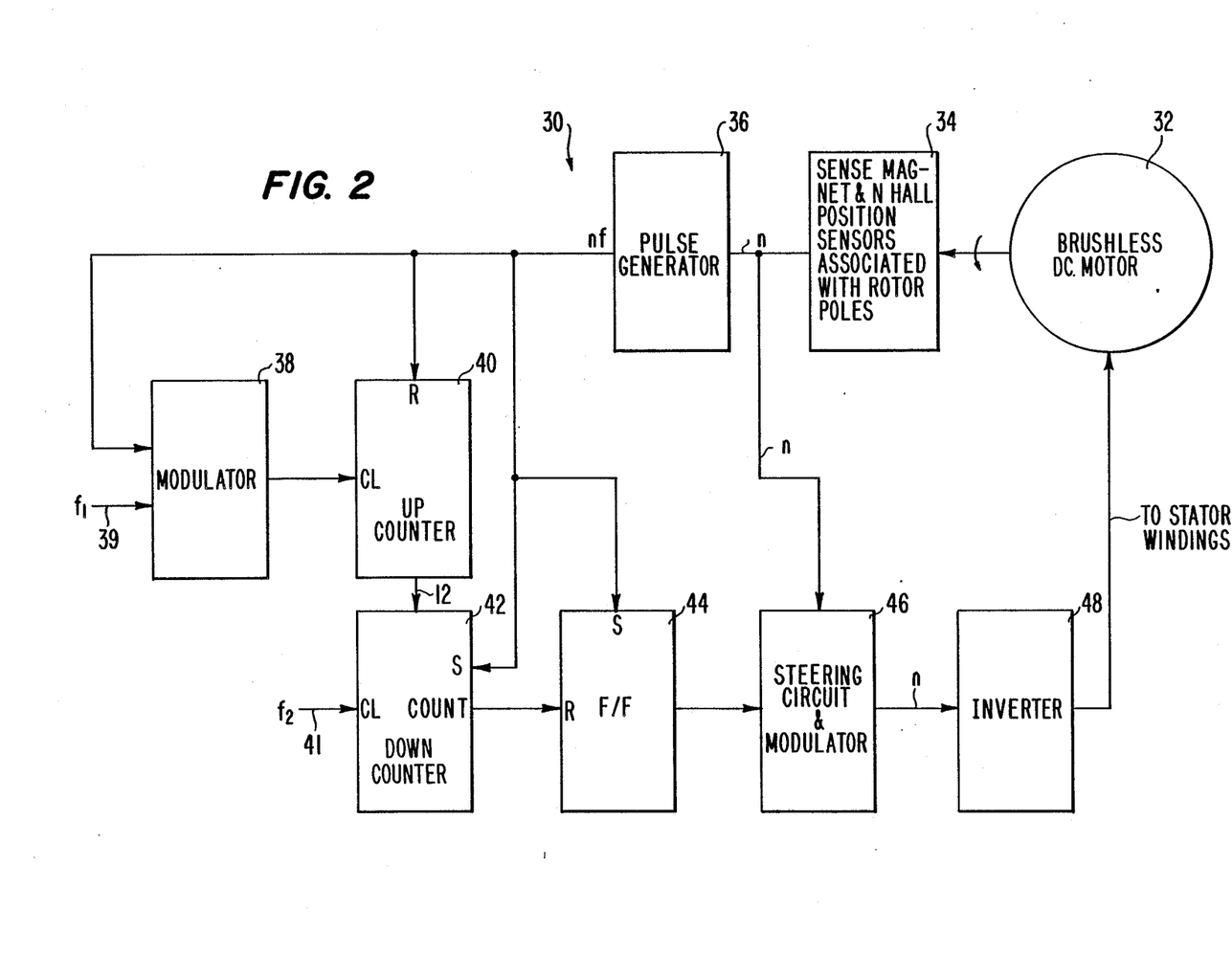
FIG. 2 illustrates a block diagram of an embodiment of the present invention.
Figure 3A:
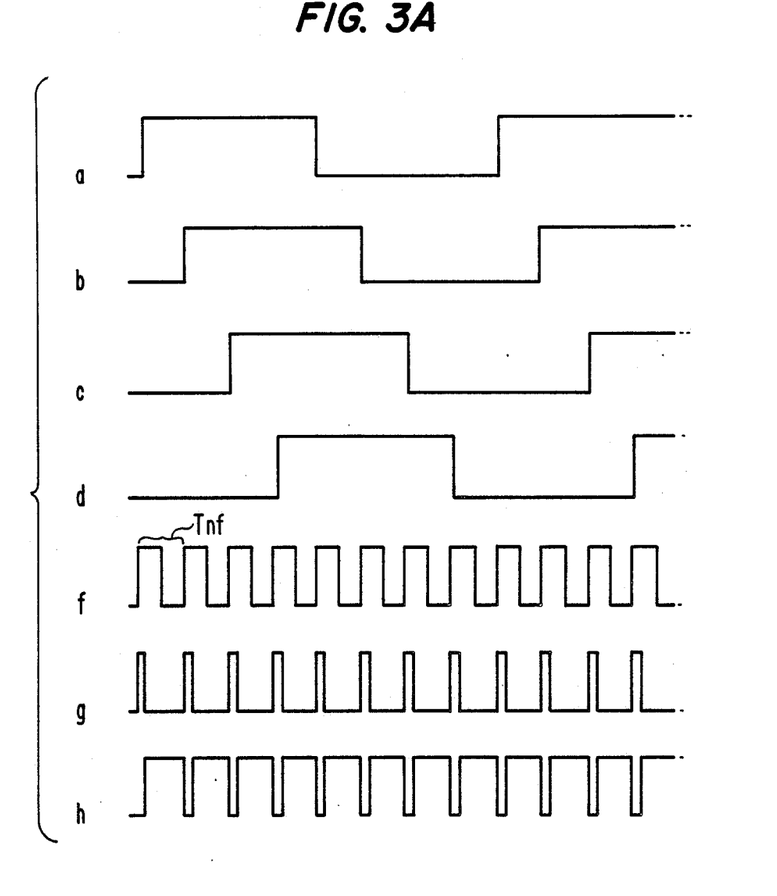
FIGS. 3A and 3B illustrate waveforms produced by parts of the embodiment of FIG. 2.
Figure 3B:
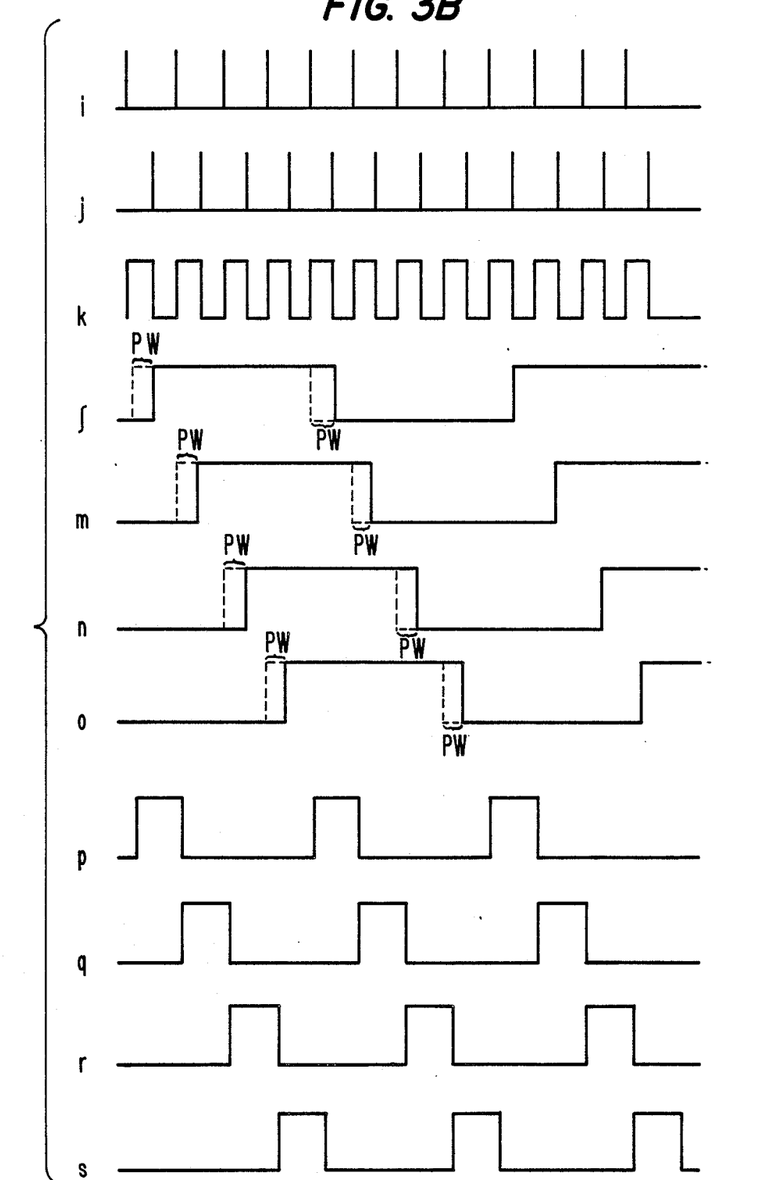

FIG. 2 illustrates a block diagram of a first embodiment 30 of the present invention. The present invention functions to provide a variable speed variable torque control for a brushless DC motor 32 useful for high speed applications. The brushless DC motor has a permanent magnet rotor containing one or more pairs of poles. Rotational torque is applied to the poles of the rotor by excitation of stator windings (not illustrated). The brushless DC motor 32 may be any conventional design. A sense magnet and n Hall position sensors associated with the rotor poles function to sense the rotary position of the rotor in a conventional fashion. The number of position sensors is independent of the number of rotor poles. Each Hall position sensor outputs a square wave signal having alternating levels such as illustrated in parts (a-d) of FIG. 3A. The number n of Hall position sensors may be equal to the number of phases present in the motor. It should be understood that the present invention is applicable to brushless DC motors 30 having any number n of position sensors, but in the example as described below with respect to FIGS. 2 and 3, the number n is equal to 4. The sense magnet and n Hall position sensors associated with rotor poles 34 has n outputs which respectively produce signals as illustrated in parts (a-d) of FIG. 3A. As illustrated in parts (a-d) of FIG. 3A, each of the output signals from its Hall sensor has a 50% duty cycle and adjacent signals which are produced by adjacent Hall sensors are phase displaced with respect to each other by 45°. When the present invention is applied to brushless DC motors having differing numbers of phases, the phase displacement between the position signals produced by adjacent Hall position sensors may be equal to $180° \simeq n$ with other phase displacements being possible. Each of the position signals produced by the Hall position sensors as illustrated in parts (a-d) of FIG. 3A has a frequency f. Pulse generator 36 produces an output pulse train as illustrated in part (g) of FIG. 3A having a frequency equal to nf. The pulse train of part (g) of FIG. 3A is produced by differentiating the signal of part (f) of FIG. 3A, which is produced by EXCLUSIVE ORing different combinations of position signals as illustrated below in parts (a-d) of FIG. 3A. The output signal from the pulse generator 36 is applied to the modulator 38 which gates a source of a first signal f1 such that the envelope of the signal f1 is as illustrated in part (h) of FIG. 3A. It should be understood that typically the frequency f1 is much greater than f so that up counter 40 will count a high number of pulses in between successive output pulses from the pulse generator 36. It is desirable that the duty cycle of the output signals from the pulse generator 36 should be fixed and have a duty cycle of 10% or less in order to provide the up counter 40 with the maximum number of pulses to be counted between successive pulses produced by the pulse generator 36. The output pulses from the pulse generator 36 are used to gate the high frequency carrier f1 into the up counter 40 to count the number of cycles of the first signal of frequency f1 that are contained within each cycle of the output signal of the pulse generator. Just before the up counter 40 is reset by the next output signal from the pulse generator 36, the pulse is used to "jam" the digital number to which the up counter 40 has counted into the "jammed" inputs of the down counter 42. The down counter is clocked by a second variable frequency signal having a frequency f2 with $f2 \geqq f1$. When the frequency f2 of the second signal is greater than the frequency f1 of the first signal, the down counter 42 reaches zero and produces a carryout pulse on the line to the right of "count" before the end of the cycle of the output signal produced by pulse generator 36. Part (i) of FIG. 3B illustrates the set input to the down counter 42 and part (j) of FIG. 3D illustrates the "count" output. Flip-flop 44 is set by the output signal from the pulse generator 36 and is reset by the "count" output of the down counter 42 to produce the waveform as illustrated in part (k) of FIG. 3B.

As a consequence of the flip-flop 44 being reset before the end of the cycle of the output signal produced by pulse generator 36, the length of the pulse at the output of the flip-flop is defined as $PW = Tnf \times f1/f2$ where Tnf is the period of the waveform illustrated in part (f) of FIG. 3A. Accordingly, for a given ratio of f1/f2, the pulse width PW is a fixed fraction of the period of the cycle of the output signal produced by the pulse generator 36 independent of the rotational velocity and the frequency of the position signals illustrated in parts (a-d) of FIG. 3B.

Steering circuit and modulator 46 controls the activation of inverter 48 as follows. Steering circuit and modulator 46 is responsive to each of the position signals outputted by the n Hall position sensors. Steering circuit and modulator 46 produces output position signals which are applied to inverter 48 as illustrated in parts (1-o) of FIG. 3A. The signals illustrated in parts (1-o) of FIG. 3B correspond respectively to the signals illustrated in parts (a-d) of FIG. 3A with each signal being respectively delayed by an amount equal to PW which is equal to the positive going portion of the signal illustrated in part (k) of FIG. 3B. Thus, the steering circuit and modulator 46 produces output delayed position signals which are delayed by a time interval equal to PW as illustrated in parts (1-o) of FIG. 3B.

Figure 4:
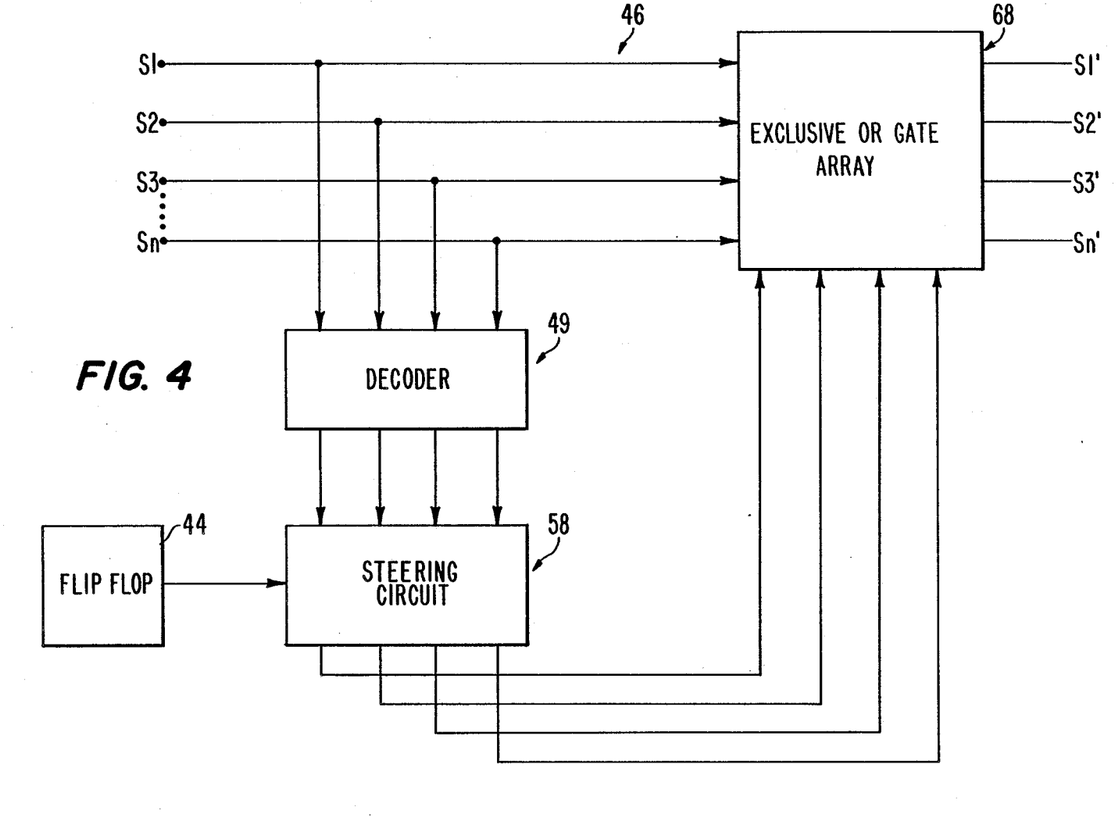
FIG. 4 illustrates a block diagram of the steering circuit and modulator of FIG. 2.

FIG. 4 illustrates a block diagram of the steering circuit and modulator 46. Decoder 49, which is a first array of EXCLUSIVE OR gates, produces the waveforms illustrated in parts (p-s) of FIG. 3B by EXCLUSIVE ORing various combinations of position signals S1-Sn. Steering circuit 58 produces a series of waveforms (not illustrated) which are the result of logically ANDing the waveform of parts (p-s) of FIG. 3B with the waveform of part (f) of FIG. 3A. A second array of EXCLUSIVE OR gates 68 EXCLUSIVE ORs the output from the steering circuit 58 with the corresponding position signals S1-Sn to produce delayed position signals S1-Sn'.

Figure 5:
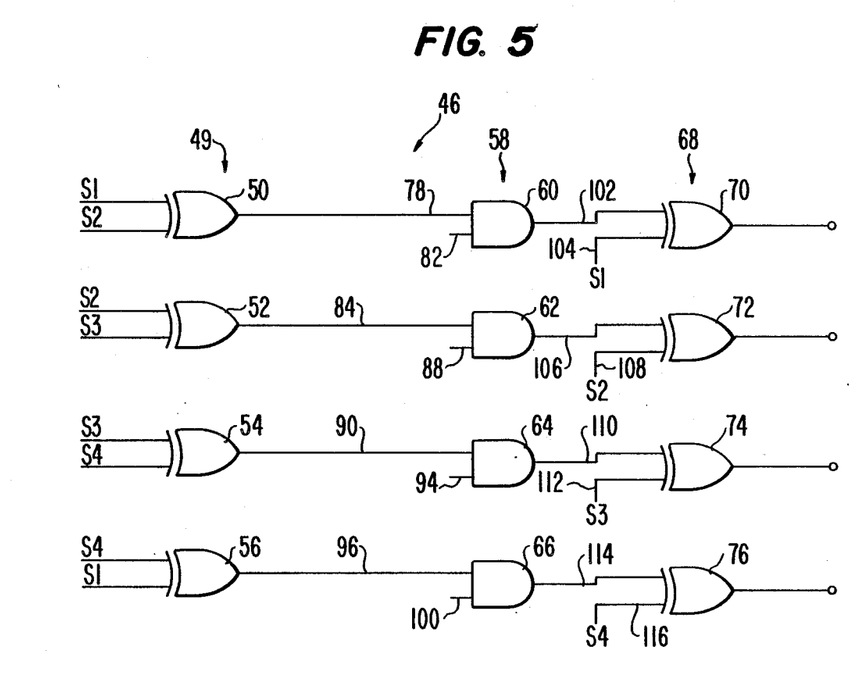
FIG. 5 illustrates an embodiment of the steering circuit and modulator of FIG. 4.

FIG. 5 illustrates an embodiment of the block diagram of FIG. 4. The decoder 49 is implemented as a first array of EXCLUSIVE OR gates 50, 52, 54, and 56. First array 49 contains a number of EXCLUSIVE OR gates equal to the number of position sensors. Each of the EXCLUSIVE OR gates 50, 52, 54 and 56 has a pair of inputs which are from different position sensors. The designations "S1-S4" respectively identify the position signal outputs from the position sensors and are respectively illustrated in parts (a-d) of FIG. 3A. The outputs 78, 84, 90 and 96 from the EXCLUSIVE OR gates 50-56 are respectively illustrated in parts (p-s) of FIG. 3B. An array of AND gates 58, comprised of AND gates 60-66, respectively produces a gating signal which is applied to a second array of EXCLUSIVE OR gates 68 comprised of EXCLUSIVE OR gates 70-76. The first AND gate 60 has a first input 78 which is the output of EXCLUSIVE OR gate 50, and a second input 82 which is the output signal produced by the flip-flop 44 as illustrated in part (k) of FIG. 3B. The second AND gate 62 has a first input 84 which is the output of the EXCLUSIVE OR gate 52 and second input 88 which is the signal as illustrated in part (k) of FIG. 3B. The third AND gate 64 has a first input 90 which is the output of EXCLUSIVE OR gate 54, and a second input which is the waveform illustrated in part (k) of FIG. 3B. The fourth AND gate 66 has a first input 96 which is the output of EXCLUSIVE OR gate 56 and a second input 100 which is the waveform illustrated in part (k) of FIG. 3B. The EXCLUSIVE OR gate 70 has a first input 102 which is the output of AND gate 60 and a second input 104 which is the signal illustrated in part (a) of FIG. 3A. The EXCLUSIVE OR gate 72 has a first input 106 which is the output of AND gate 62 and a second input 108 which is the position signal of part (b) of FIG. 3A. The EXCLUSIVE OR gate 74 has a first input 110 which is the output of AND gate 64 and a second input 112 which is the position signal illustrated in part (c) of FIG. 3A. The EXCLUSIVE OR gate 76 has a first input 114 which is the output of AND gate 66 and a second input 116 which is the position signal illustrated in part (d) of FIG. 3A. The output of EXCLUSIVE OR gate 70 is the signal illustrated in part (1) of FIG. 3B; the output of the EXCLUSIVE OR gate 72 is the signal illustrated in part (m) of FIG. 3B, the output of the EXCLUSIVE OR gate 74 is the signal illustrated in part (n) of FIG. 3B; and the output of the EXCLUSIVE OR gate 76 is the signal illustrated in part (o) of FIG. 3B.

Figure 6A:
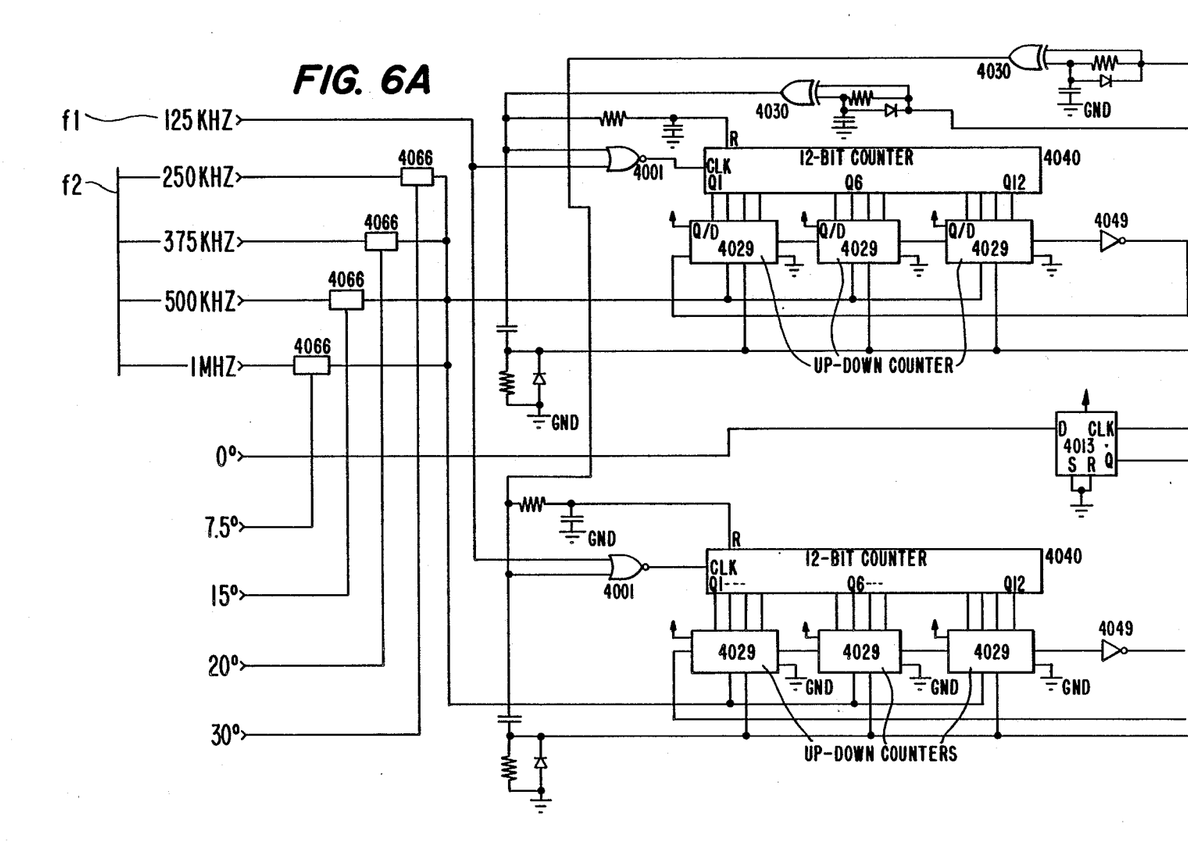
FIGS. 6A and 6B illustrate a circuit schematic of an embodiment of the present invention used with a six-phase motor in which two three-phase systems based upon the block diagram of FIG. 2 are operated in parallel to provide twice the phase delay than the system of FIG. 2.
Figure 6B:
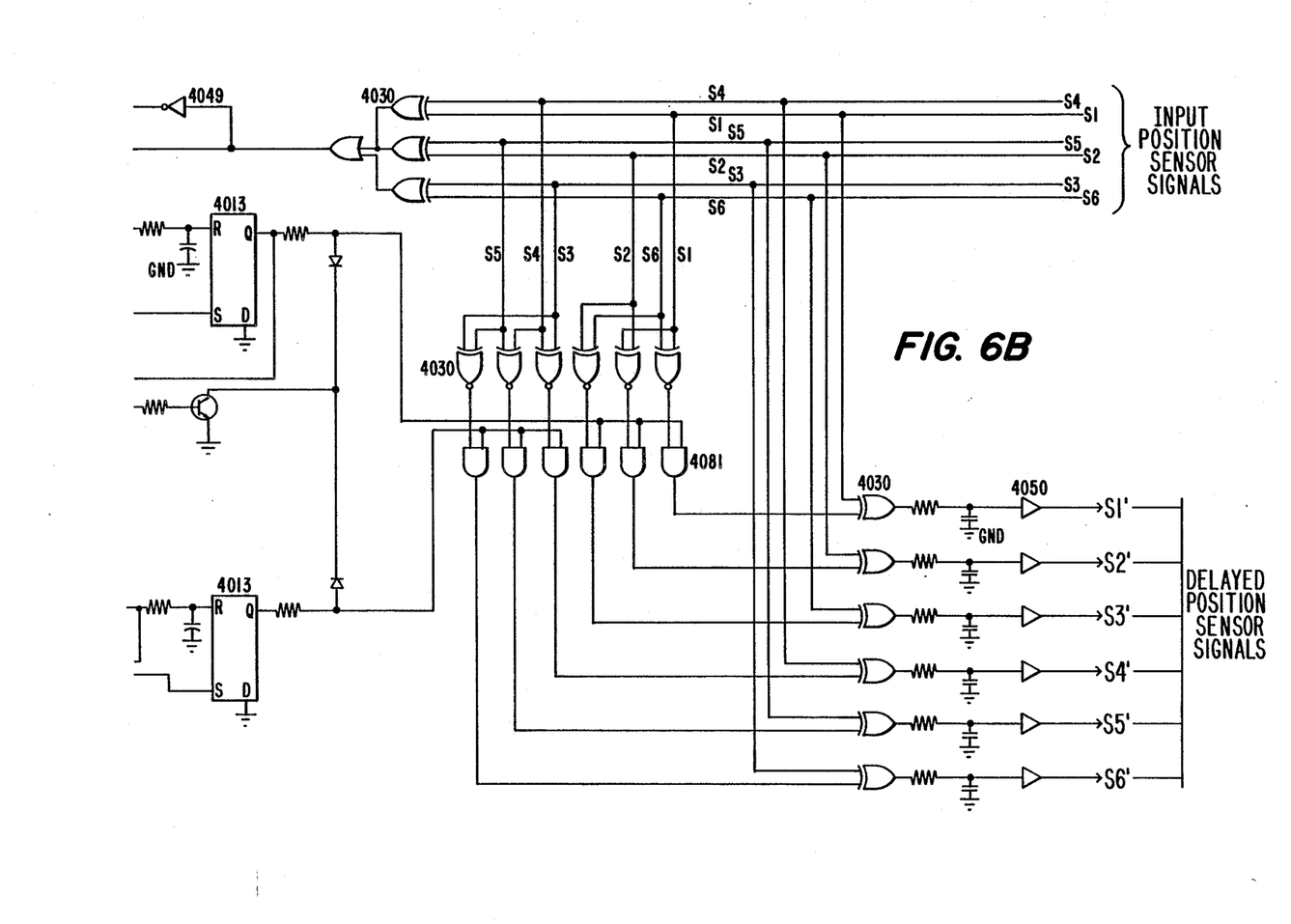

FIGS. 6A and 6B illustrate a second embodiment of the present invention used for controlling a brushless DC motor having a rotor with six phases and six associated position sensors. This embodiment differs from the first embodiment of FIG. 2 in that the phase delay is equal to $2f1/nf2$ which is twice the delay achievable with the first embodiment. The doubling of the phase delay is achieved by operating two phase delay systems lie that illustrated in FIG. 2 in parallel. Except for providing two parallel systems, the system of FIGS. 6A and 6B operates on the same principal as described above with reference to FIG. 2. The pair of 12 bit up counters and associated 12 bit down counters operate in parallel to control the generation of output pulses by the "4013" flip-flop which each correspond to flip-flop 44 of FIG. 2. In the first system of the parallel systems, the EXCLUSIVE OR gates, which drive the right-hand "4081" gate, correspond to the decoder 48 of FIG. 4 and in the second system of the parallel systems the EXCLUSIVE OR gates, which drive the left-hand "4081" gates, correspond to the decoder 48 of FIG. 4. The left three "4081" AND gates correspond to the steering circuit 58 of FIG. 4 of the second system of the parallel systems and the right three "4081" AND gates correspond to the steering circuit 58 of FIG. 4 of the first system of the parallel systems. The top three "4030" EXCLUSIVE OR gates correspond to the second array of EXCLUSIVE OR gates 68 of FIG. 4 of the first system of the parallel systems and the bottom three "4030" EXCLUSIVE OR gates correspond to the second array of EXCLUSIVE OR gates 68 of the second system of the parallel systems. The signals S1-S6 respectively are the output of the position sensors with position signals S1, S2 and S6 being applied to one phase delay system and signals S3-S5 being applied to the other phase delay system. As illustrated, the embodiment provides fixed phase delays of 7.5°, 15°, 20° and 30° as determined by ratio of the selection of one of a plurality of signals f2 respectively equal to 1 MHz, 500 kHz, 375 kHz and 250 kHz with $f1 = 125$ kHz. A zero phase delay is achieved by grounding the inputs to the array of "4081" AND gates by means of the D type flip-flop connected to the input labeled "4013". Furthermore, the fixed phase delays of 7.5°–30° may be replaced with a continuously variable phase delay by providing a variable frequency source f2 as in FIG. 2. Conventional integrated circuits are identified by their industry designation or manufacturer's part designation.

While the invention has been described in terms of its preferred embodiment, it should be understood that numerous modifications may be made thereto without departing from the spirit and scope of the invention as defined in the appended claims. For example, while specific embodiments have been illustrated which respectively provide phase delays of $f1/nf2$ and $2f1/nf2$, the invention may be extended to provide phase delays of $mf1/nf2$ where m is an integer which is equal to the number of pairs of up and down counters 40 and 42 which are simultaneously operating in parallel as in FIGS. 6A and B. It is intended that all such modifications fall within the scope of the appended claims.

What is claimed:

1. A variable speed variable torque brushless DC motor having a rotor, stator windings, and at least one rotor position sensor with each position sensor producing a position signal indicating position of the rotor and having a frequency equal to a frequency of excitation current applied for activating the stator windings of the motor, comprising:

a pulse generator, responsive to the at least one position sensor, for producing first pulses having a frequency which is equal to nf where n is the number of position sensors and f is the frequency of excitation current;

a source of a first signal having a frequency f1 wherein $f1 > f$;

a source of a variable frequency second signal having a frequency f2 with $f2 \geq f1$;

an excitation circuit for applying excitation current pulses to the stator windings with the excitation current pulses occurring in response to the position signals produced by the at least one position sensor; and a delay circuit, responsive to the first pulses, the first signal, and the second signal for delaying application of the position signals to the excitation circuit with the delay being equal to $mf1/mf2$ wherein m is an integer.

2. A brushless DC motor in accordance with claim 1 wherein the delay circuit comprises:

a first counter, responsive to the first pulses and to the first signal, for counting a number of cycles of the first signal which occur between the successive first pulses;

a second counter, responsive to the first pulses, the second signal, and a count of the first counter occurring before resetting of the first counter for counting down from the count of the first counter to zero for producing a reset pulse in response to each time the second counter counts to zero;

a flip-flop, having a set terminal coupled to receive the first pulses and a reset terminal coupled to receive the reset pulses, for producing a delay signal having a duration equal to a time interval between a successive occurrence of a first pulse being applied to the set terminal and a reset pulse being applied to the reset terminal; and means, responsive to the flip-flop and the position sensors, for producing the delayed position signals which are applied to the excitation circuit, each delayed position signal corresponding to a single position signal produced by one of the position sensors.

3. A brushless DC motor in accordance with claim 2 wherein the means for producing the delayed position signals comprises:

a first array of EXCLUSIVE OR gates, equal in number to the number of position sensors, each EXCLUSIVE OR gate having a pair of inputs with the inputs of each EXCLUSIVE OR gate being coupled to different position sensors with none of the EXCLUSIVE OR gates having an identical combination of input connections, each EXCLUSIVE OR gate having an output;

an array of AND gates equal in number to the number of EXCLUSIVE OR gates with one AND gate corresponding to one EXCLUSIVE OR gate, each AND gate having an input coupled to the output of the corresponding EXCLUSIVE OR gate and a second input coupled to receive the delay signal;

a second array of EXCLUSIVE OR gates, equal in number to the number of the position sensors, an EXCLUSIVE OR gate in the second array corresponding to an AND gate in the array of AND gates and a position sensor, each EXCLUSIVE OR gate of the second array having a pair of inputs with one of the inputs of each of the EXCLUSIVE OR gates of the second array being coupled to the output of the corresponding AND gate and the other input coupled to the corresponding position sensor, outputs of the EXCLUSIVE OR gates of the second array being the delayed position signals.

4. A brushless DC motor in accordance with claim 1 wherein:
m=1.

5. A brushless DC motor in accordance with claim 1 wherein:
m=2.

6. A brushless DC motor in accordance with the claim 2 wherein:
m=1.

7. A brushless DC motor in accordance with claim 2 wherein:
m=2.

8. A brushless DC motor in accordance with claim 3 wherein:
m=1.

9. A brushless DC motor in accordance with claim 3 wherein:
m=2.

10. A variable speed variable torque brushless DC motor having a rotor, stator windings, and at least one rotor position sensor with each position sensor producing a position signal indicating position of the rotor and having a frequency equal to a frequency of excitation current applied for activating the stator windings of the motor, comprising:

a pulse generator, responsive to the at least one position sensor, for producing first pulses having a frequency which is equal to nf where n is the number of position sensors and f is the frequency of excitation current;

a source of a first signal having a frequency f1 wherein $f1 > f$;

a source of a variable frequency second signal having a frequency f2 with $f2 \geq f1$;

an excitation current for applying excitation current pulses to the stator winding with the excitation current pulses occurring in response to the position signals produced by the at least one position sensor; and a plurality of delay circuits, the number of delay circuits being an integer $m \geq 2$, each delay circuit being responsive to the first pulses, the first signal and the second signal for delaying application of the position signals to the excitation circuit with the delay being equal to mf1/mf2.

11. A brushless DC motor in accordance with claim 10 wherein each delay circuit comprises:

a first counter, responsive to the first pulses and to the first signal, for counting a number of cycles of the first signal which occur between the successive first pulses;

a second counter, responsive to the first pulses, the second signal, and a count of the first for counting down from the count of the first counter to zero for producing a reset pulse in response to each time the second counter counts to zero;

a flip-flop, having a set terminal coupled to receive the first pulses and a reset terminal coupled to receive the reset pulses, for producing a delay signal having a duration equal to a time interval between a successive occurrence of a first pulse being applied to the set terminal and a reset pulse being applied to the reset terminal; and means, responsive to the flip-flop and the position sensors, for producing the delayed position signals which are applied to the excitation circuit, each delayed position signal corresponding to a single position signal produced by one of the position sensors.

12. A brushless DC motor in accordance with claim 11 wherein the means for producing the delayed position signals comprises:

a first array of EXCLUSIVE OR gates, equal in number to the number of position sensors, each EXCLUSIVE OR gate having a pair of inputs with the inputs of each EXCLUSIVE OR gate being coupled to a different position sensor with none of the EXCLUSIVE OR gates having an identical combination of input connections, each EXCLUSIVE OR gate having an output;

an array of AND gates equal in number to the number of EXCLUSIVE OR gates with one AND gate corresponding to one EXCLUSIVE OR gate, each AND gate having an input coupled to the output of the corresponding EXCLUSIVE OR gate and a second input coupled to receive the delay signal;

a second array of EXCLUSIVE OR gates, equal in number to the number of the position sensors, an EXCLUSIVE OR gate in the second array corresponding to an AND gate in the array of AND gates and position sensor, each EXCLUSIVE OR gate of the second array having a pair of inputs with one of the inputs of each of the EXCLUSIVE OR gates of the second array being coupled to the output of the corresponding AND gate and the other input coupled to the corresponding position sensor, outputs of the EXCLUSIVE OR gate of the second array being the delayed position signals.

* * * * *